US011005357B2

(12) United States Patent
Götzelmann et al.

(10) Patent No.: US 11,005,357 B2
(45) Date of Patent: May 11, 2021

(54) SHORT-CIRCUIT-PROOF INVERTER HAVING A DIRECT CURRENT CONTROL

(71) Applicant: Siemens Aktiengesellschaft, Munich (DE)

(72) Inventors: Michael Götzelmann, Estenfeld (DE); Harald Wiessmann, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 16/970,877

(22) PCT Filed: Feb. 7, 2019

(86) PCT No.: PCT/EP2019/052976
§ 371 (c)(1),
(2) Date: Aug. 18, 2020

(87) PCT Pub. No.: WO2019/158422
PCT Pub. Date: Aug. 22, 2019

(65) Prior Publication Data
US 2021/0050770 A1 Feb. 18, 2021

(30) Foreign Application Priority Data
Feb. 19, 2018 (EP) .................... 18157423

(51) Int. Cl.
*H02M 1/32* (2007.01)
*H02M 7/5387* (2007.01)

(52) U.S. Cl.
CPC ......... *H02M 1/32* (2013.01); *H02M 7/53871* (2013.01)

(58) Field of Classification Search
CPC . H02M 2001/0003; H02M 2001/0009; H02M 2001/325; H02M 1/084;
(Continued)

(56) References Cited

U.S. PATENT DOCUMENTS 4,816,981 A * 3/1989 Nishihiro ................ H02M 7/48
363/37
5,012,400 A * 4/1991 Yasuda ................... H02M 1/12
363/39
(Continued)

FOREIGN PATENT DOCUMENTS

| CN | 104578082 A | 4/2015 |
| CN | 106972471 A | 7/2017 |
| CN | 1066100359 A | 7/2017 |

OTHER PUBLICATIONS

Bottrell Nathani et al: "Comparison of Current-Limiting Strategies During Fault Ride-Through of Inverters to Prevent Latch-Up and Wind-Up", IEEE Transactions on Power Electronics, Institute of Electrical and Electronics Engineers, USA, vol. 29, No. 7, Seiten 3786-3797, XP011540339, ISSN: 0885-8993, DOI: 10.1109/TPEL. 2013.2279162, gefunden am Feb. 17, 2014, abstract, pp. 3786-3790; fig. 1-3,6, p. 3794; fig. 14-16; 2014.
(Continued)

*Primary Examiner* — Alex Torres-Rivera
*Assistant Examiner* — David A. Singh
(74) *Attorney, Agent, or Firm* — Henry M. Feiereisen LLC

(57) ABSTRACT

A converter feeds phase currents into phase lines by applying alternately a high and a low potential via phase units. The phase currents are supplied via a filter device arranged downstream of the converter, with a portion of the filter currents supplied to filter capacitors connected to the phase lines, and feeds the remaining parts of the phase currents supplied to an electric load. The control device accepts the phase currents. A regulating device determines control signals for the phase units by direct-current control, such that a voltage profile downstream of the filter device has a predetermined amplitude when and as long as the supplied phase currents have minimum spacing from a predetermined
(Continued)

maximum value. Otherwise, the control device intervenes in the control of the phase units by limiting the phase currents to the maximum value, until the voltage profile downstream of the filter device regains the predetermined amplitude.

13 Claims, 7 Drawing Sheets

(58) Field of Classification Search
CPC ............ H02M 1/32; H02M 1/34; H02M 7/53; H02M 7/537; H02M 7/538; H02M 7/5383; H02M 7/53846; H02M 7/5387; H02M 7/53871; H02M 7/53873
See application file for complete search history.

(56) References Cited

U.S. PATENT DOCUMENTS

| | | | | |
|---|---|---|---|---|
| 5,757,099 A * | 5/1998 | Cheng | ....................... | H02J 3/01 307/105 |
| 6,317,339 B1 * | 11/2001 | Shimazaki | ................ | H02J 3/38 363/37 |
| 6,459,597 B1 * | 10/2002 | Igarashi | .................. | H02M 1/12 363/34 |
| 2012/0262079 A1 * | 10/2012 | Lin | .................... | H05B 45/3725 315/206 |
| 2013/0286692 A1 * | 10/2013 | Patel | ..................... | H02M 1/126 363/37 |
| 2013/0289911 A1 * | 10/2013 | Patel | ..................... | H02M 1/126 702/65 |
| 2015/0036397 A1 | 2/2015 | Wang et al. | | |
| 2016/0111975 A1 * | 4/2016 | Hasegawa | ............. | H02M 7/487 363/97 |
| 2017/0331296 A1 * | 11/2017 | Leiting | .................. | G01R 31/42 |
| 2018/0026550 A1 * | 1/2018 | Dent | ....................... | H02J 3/381 363/56.01 |

OTHER PUBLICATIONS

Mukherjee Subhajyoti et al: "Filter capacitor current estimation and grid current control in LCL based grid connected Inverter", 2017 IEEE Energy Conversion Congress and Exposition (ECCE), IEEE, pp. 3885-3889, XP033247329, DOI: 10.1109/ECCE.2017. 8096683. gefunden am Nov. 3, 2017, pp. 3885, right column; fig. 1, pp. 3886-3887; 2017.

PCT International Search Report and Written Opinion of International Searching Authority dated Jun. 12, 2020 corresponding to PCT International Application No. PCT/EP2019I052976 filed Feb. 7, 2019.

Bottrell, Nathanierl et al:; Comparison of Current Limiting Strategies During Fault Ride-through of Inverters to Prevent Latch-up and Wind-up; IEEE Transactions of Power Electronics; vol. 29; No. 9, pp. 3786-3797;; 2013.

* cited by examiner

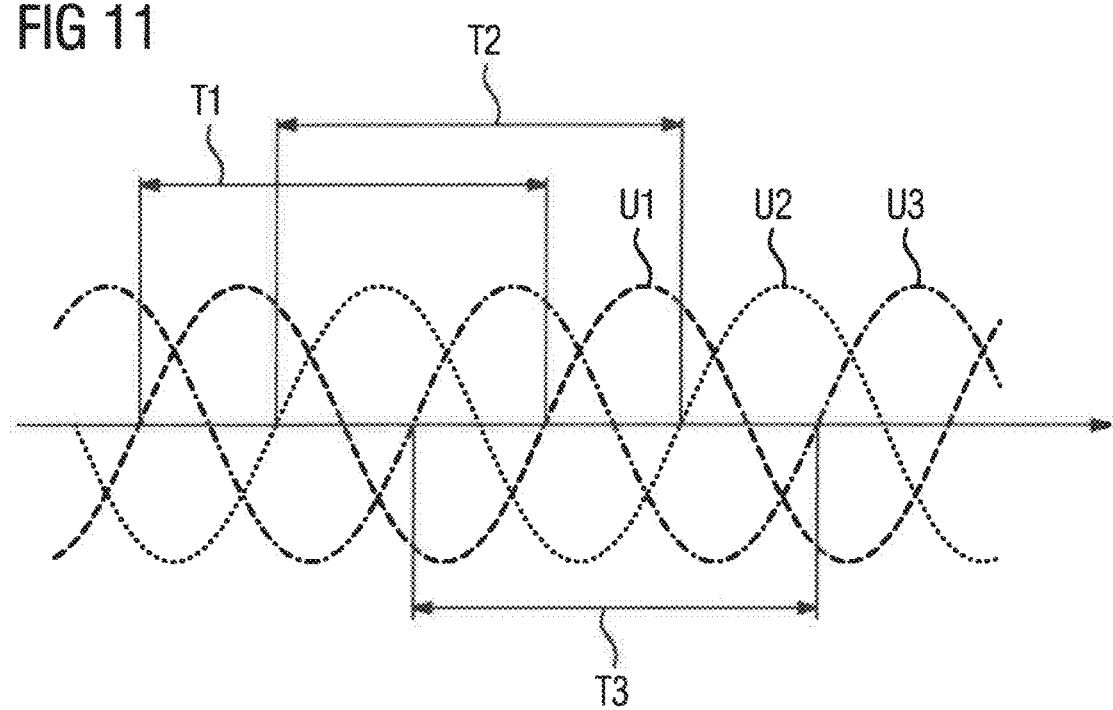

SHORT-CIRCUIT-PROOF INVERTER HAVING A DIRECT CURRENT CONTROL

CROSS-REFERENCES TO RELATED APPLICATIONS

This application is the U.S. National Stage of International Application No. PCT/EP2019/052976, filed Feb. 7, 2019, which designated the United States and has been published as International Publication No. WO 2019/158422 A1 and which claims the priority of European Patent Application, Serial No. 18157423.7, filed Feb. 19, 2018, pursuant to 35 U.S.C. 119(a)-(d).

BACKGROUND OF THE INVENTION

The present invention relates to a control device for a converter, wherein the converter switches a high potential provided at the input side of the converter and a low potential provided at the input side of the converter alternately for each of a number of phases via a respective phase unit of the converter, in each case to a phase line, and thereby feeds phase currents into the phase lines, wherein the phase currents are fed via a filter device arranged downstream of the converter, wherein the filter device taps off filter currents at the phase lines via a number of filter capacitors arranged one above the other between the phase lines at connection points of the phase lines or via a number of filter capacitors connected at the connection points, each to one of the phase lines, and feeds the remaining portions of the phase currents to an electrical load as load currents,
  wherein the control device has a regulating device which determines activation signals for the phase units of the converter and activates the phase units of the converter accordingly,
  wherein the control device receives the phase currents fed into the phase lines.

The present invention also relates to a control program for a programmable control device for a converter, wherein the control program comprises machine code by means of which the control device is thus configured.

The present invention further relates to a converter unit,
  wherein the converter unit has a converter which switches a high potential provided at the input side of the converter and a low potential provided at the input side of the converter alternately for a number of phases via a respective phase unit of the converter, in each case to a phase line and thereby feeds phase currents into the phase lines,
  wherein the converter unit has a filter device arranged downstream of the converter and via which the phase currents are fed,
  wherein the filter device taps off filter currents at the phase lines via a number of filter capacitors arranged between the phase lines at connection points of the phase lines or via a number of filter capacitors connected to the phase lines at the connection points, each to one of the phase lines, and feeds the remaining portions of the phase currents to an electrical load as load currents,
  wherein the converter unit has a control device of the aforementioned type which controls the converter.

Converters and the associated control devices are commonly known. They mostly function on the principle that the control device determines, on the basis of phase voltages occurring within or downstream of the filter device in conjunction with setpoint phase voltages, the activation signals for the phase units of the converter. The activation signals can be determined, for example, such that a pulse width-modulated activation of the phase units takes place. The corresponding procedure is commonly known to persons skilled in the art. It typically occurs by means of a so-called space vector modulation. With these procedures, the phase voltages fed to the load can be regulated exactly to within a few volts.

In a determination of setpoint phase voltages and a determination of the activation signals based thereon, the phase currents adapt freely. As a result, they are determined by the load. This is unproblematic provided that adapting phase currents lie below a maximum permissible maximum value. If, however, this maximum value is reached or exceeded, in the prior art, the converter must be switched off very rapidly to protect it against destruction. Therefore in the converters according to the prior art, the phase currents flowing at the output side of the converter are detected and received by the control device. If the phase currents exceed a pre-determined maximum value—for example, because a short circuit has occurred in the load—the converter is switched off.

The prior art procedure functions very well if, by means of the converter, only one singular load, for example a single drive, is supplied with electrical energy. In some cases, however, the converter is to supply a so-called microgrid with electrical energy, i.e. all the consumers that are arranged within the corresponding microgrid. If, in such a case, a short-circuit and thus an increased current flow, occurs in one of the consumers, in this event, it is in principle still possible to switch off the converter. However, this has the result that not only the defective consumer, but all the consumers of the microgrid are switched off.

In order to prevent switching off of the converter for all the consumers, switch-off elements such as over-current protectors or circuit-breakers which, in the event of a short-circuit, interrupt the current flow from the converter to the respective consumers or to the respective group of consumers are therefore arranged upstream of the individual consumers or groups of consumers. However, the converter itself is not switched off. The remainder of the microgrid is thus further supplied with electrical energy by the converter.

It is problematic with this embodiment that the switch-off elements usually have reaction times in the region of seconds (and sometimes even longer). A converter, however, has overload resistance for a few microseconds. It must therefore be ensured by suitable measures that the phase currents fed by the phase units into the phase lines do not exceed the maximum current tolerated by the converter.

A conceivable solution lies in designing the converter accordingly so that it also withstands the high short-circuit currents. However, this would have the result that the converter is greatly overdimensioned for normal operation in which no short-circuit occurs. This solution is therefore not economic. In practice, therefore, other means must be found to be able to maintain the operation of the converter, even during a short-circuit in one of the connected consumers. In particular, therefore, the phase currents fed into the phase lines must be limited in a suitable manner. The phase currents must, however, be large enough that the switch-off element which is arranged upstream of the defective consumer reliably switches off. The converter must therefore be further operated with a reduced output voltage. This reduced output voltage must be determined such that the converter supplies the correspondingly large phase currents, so that the switch-off element is triggered, but that the converter, however, is not damaged by the large phase currents.

It is an object of the present invention to provide possibilities by means of which both a normal operation of the converter (i.e. the phase voltages lie, with slight deviations, at their setpoint values and the phase currents fed in are below the maximum value) and also a short-circuit operation (i.e. the phase voltages are limited to values below their setpoint values, so that the phase currents fed into the phase lines do not rise above the maximum value) can be realized in a simple and efficient manner. In particular, a simple and fault-free changeover between normal operation and short-circuit operation is to be possible.

SUMMARY OF THE INVENTION

The object is achieved with a control device as set forth hereinafter. Advantageous embodiments of the control device are the subject matter of dependent claims.

According to the invention, a control device of the type mentioned in the introduction is configured in such a way
- that the regulating device determines the activation signals for the phase units of the converter by means of a direct current regulation to which currents flowing at the output side of the converter are fed as actual values and, as setpoint values, the associated setpoint currents are fed,
- that the regulating device determines the activation signals in such a way that a voltage profile downstream of the filter device brought about by the activation of the phase units has a predetermined amplitude if and for as long as the amounts of the phase currents fed into the phase lines have a minimum spacing from a predetermined maximum value, and
- that, by means of a further device, the control device engages in the activation of the phase units in such a way that the amounts of the phase currents fed into the phase lines are limited to the maximum value until the voltage profile downstream of the filter device brought about by the activation of the phase units again has the predetermined amplitude.

Currents are therefore regulated directly. This type of regulation can be realized in a highly dynamic manner. The direct current regulation can be active both in short-circuit operation and also in normal operation. It is necessary only to limit the phase current flowing in each phase line during short-circuit operation to its maximum value.

The direct current regulation can function, for example, in the manner of a two-step controller: For each of the currents to be regulated, an interval is defined around the respective setpoint current, within which the respective actual current is to lie. If the respective actual current reaches or falls below the upper or lower limit of the interval, the respective activation of the converter is changed accordingly. In particular, for example, by means of the respective phase unit, the input-side potential applied to the respective phase line can be changed. However, other types of regulation are also conceivable. In particular, it is also possible conversely, for the other phase lines, to change to the potential applied to these phase lines. What is important, after all, is to reduce the potential difference (=voltage) between the individual phases. For this, either the potential in one phase line can be adapted to the potential in the other phase lines or the potentials in the other phase lines can be adapted to the potential in the one phase line. A known method which is also usable in the present case for current regulation is, for example, the SDHC method. This stands for Switched Diamond Hysteresis Control.

The filter device comprises—in addition to the filter capacitors—preferably upstream and downstream of the connection points, an inductor arranged in each of the phase lines. However, other embodiments of the filter device are also possible.

In individual cases, it is possible that the converter operates only a single phase alternating voltage system. In this case, the converter has two phase lines. Typically, however, the converter operates a polyphase system with at least three phases and usually exactly three phases. In this case, the filter capacitors can each be connected either in the manner of a delta connection to two phase lines each, or in the manner of a star connection, having a common neutral point. In the case of a star connection, the potential of the neutral point can alternatively be fixedly defined relative to the potentials at the input side or can be floating and variable relative to said potentials.

By means of the direct current regulation, in normal operation, it is still not necessary to switch from a pulse-width modulated voltage regulation, which in normal operation is sufficient, to a direct current regulation, which is necessary in short-circuit operation. Rather, the regulation method can be maintained uniformly for normal operation and short-circuit operation. It is necessary only to limit the setpoint phase currents accordingly.

It is possible
- that the further device is configured as a changeover device,
- that, in a normal operation, as actual values, the changeover device feeds the filter currents to the regulating device and, as setpoint values, setpoint filter currents determined by a setpoint generator if and for as long as the amounts of the phase currents fed into the phase lines have the minimum spacing from the predetermined maximum value,
- that the changeover device changes from normal operation into a short-circuit operation in which, as actual values, the changeover device feeds to the regulating device the phase currents and, as the setpoint value, the maximum value or the inverse of the maximum value if and as soon as the amounts of the phase currents fall below the minimum spacing from the maximum value, and
- that the changeover device changes again from short-circuit operation to normal operation if and as soon as the voltage profile downstream of the filter device brought about by the activation of the phase units has the predetermined amplitude again.

By means of this type of regulation, a good voltage regulation is particularly easy to implement in normal operation. This procedure is based upon the concept that in normal operation, the temporal profile of the phase voltages is known and thus the temporal profile of the filter currents is also known. Thus the associated temporal profiles of the setpoint filter currents can be predetermined and the filter currents regulated to their setpoint values. By this means, the phase voltages become adjusted according to the target profiles. Through the changeover to regulation of the phase currents in short-circuit operation, however, the converter is protected from overloading.

In the simplest case, the control device receives the filter currents themselves as measured variables. A direct current measurement, however, has the disadvantage that the corresponding current measuring device is relatively costly. Preferably, the control device therefore determines the filter currents on the basis of measured variables detected and received by the control device. Further measured variables which come into consideration are, in particular, phase voltages of the phase lines which are measured within or downstream of the filter device. If the phase voltages are measured within the filter device, the filter currents can be determined—at least in some cases—directly on the basis of the detected phase voltages. If the phase voltages are measured downstream of the filter device, the filter currents can be determined in a model-based manner on the basis of the detected phase voltages and the phase currents detected at the output side of the converter.

As an alternative to a changeover between a regulation of the filter currents in normal operation and a regulation of the phase currents in short-circuit operation, it is possible that the phase currents are always fed to the regulating device. In this case, the control device is configured such that the control device determines, on the basis of the phase currents and further-measured variables for the phase lines detected at the output side of the converter, the load currents fed to the load, the control device has a setpoint generator which determines setpoint filter currents for the phase lines, the control device has an adding device to which the load currents determined by the current determining device and the setpoint filter currents are fed and which determines, on the basis of the load currents and the setpoint filter currents, preliminary setpoint phase currents to be provided by the converter, and a further device is configured as a limiting device to which the preliminary setpoint phase currents determined by the adding device are fed and which limits the amount of the preliminary setpoint phase currents to the maximum value and feeds the correspondingly limited setpoint phase currents to the regulating device as setpoint values.

Since in this case, the load currents are determined by means of the current determining device with a high dynamic response and the setpoint filter currents relate to normal operation, only the limitation of the preliminary setpoint phase currents must be undertaken in order to ensure a reliable operation of the converter. A changeover is no longer required.

This operating mode is based upon the concept that in normal operation, the temporal profile of the phase voltages is known and thus the temporal profile of the filter currents is also known. By means of the predetermination of the associated temporal profiles of the setpoint filter currents in combination with the determined load currents, the setpoint values can thus be provided for the current regulation.

In the simplest case, the control device receives the filter currents themselves directly as further measured variables. A direct current measurement, however, has the disadvantage that the corresponding current measuring device is relatively costly. Preferably, the control device therefore receives phase voltages of the phase lines as further measured variables which are detected within or downstream of the filter device. If the phase voltages are detected within the filter device, the current determining device can determine the filter currents—at least in some cases—directly on the basis of the detected phase voltages. From the filter currents, in conjunction with the phase currents, the load currents can be determined. If the phase voltages are detected downstream of the filter device, the load currents are determined in a model-based manner on the basis of the detected phase voltages and of the phase currents detected at the output side of the converter.

In a preferred embodiment, the control device has a computer device and an extrapolation device. The computer device determines the filter currents or the load currents fed to the load. The determination takes place for a time point at which the measured variables, on the basis of which the filter currents or the load currents are determined, are measured. The computer device feeds the filter currents or load currents determined by it to the extrapolation device. The extrapolation device modifies the filter currents or load currents fed to it in such a way that they are extrapolated in relation to a nominal frequency of the phase voltages by an extrapolation time. Thereafter, the extrapolation device feeds the filter currents modified by it to the changeover device, or the load currents to the adding device. The extrapolation time is suitably determined. It is determined, in particular, such that the modifications—in relation to a previously known nominal frequency of the phase voltages—reflect the corresponding temporal change of the filter currents.

Alternatively, it is possible that the order of the determination by the computer device and the extrapolation by means of the extrapolation device are swapped. In this event, the extrapolation device modifies the measured variables, on the basis of which the filter currents or the load currents fed to the load are determined, such that, relative to a time point at which the measured variables are detected, they are extrapolated in relation to a nominal frequency of the phase voltages by the extrapolation time. It feeds the measured variables modified by it to the computer device. In this event, the computer device determines the filter currents or the load currents on the basis of the modified measured variables fed to it and feeds the filter currents to the changeover device or the load currents to the adding device.

Preferably, the control device receives phase voltages of the phase lines detected within or downstream of the filter device. In this case, the setpoint generators are configured for the phases, preferably as voltage regulators to which the detected phase voltages and setpoint phase voltages are fed and which, on the basis of the detected phase voltages and the setpoint phase voltages, determines the setpoint filter currents. By this means, the stability of the regulation effected can be ensured in a simple and reliable manner.

The setpoint generators are preferably regulators with an integral portion, in particular PI-regulators. Their dynamic response is often relatively small. Typically, to correct for a disturbance, the setpoint generators require 2 to 4 periods, in particular 3 periods. The periods are related to a nominal frequency with which the phase voltages are to oscillate.

Preferably, the control device has pilot control devices to which the setpoint phase voltages are fed and which determine, on the basis of the setpoint phase voltages, pilot control values for the setpoint filter currents determined by the setpoint generators. In this event, the pilot control values can be applied to the setpoint filter currents determined by the setpoint generators. By this means, the dynamic response of the reference variable determination can be significantly improved, often by 50% or more.

As mentioned above, typically, the converter operates a three-phase system. The number of phases is therefore usually three. In this event, the control device preferably has a voltage determining device which receives the phase voltages of the phase lines detected within or downstream of the filter device and for each of the phase voltages determines an amplitude in relation to a neutral point. Furthermore, in this case, the control device has an amplitude regulator for each of the phases to which as the actual value, the respective amplitude is fed and as the setpoint value, the mean value of the amplitudes is fed and which, on the basis of its respective actual value and its respective setpoint value, determines a respective first correction value for the respective setpoint filter current and corrects the respective setpoint filter current by the respective first correction value. By means of this embodiment, the amplitudes of the phase voltages can be matched to one another.

The determination of the amplitudes in relation to the neutral point is commonly known to persons skilled in the art. It is, in particular, also executable if (in the case of a delta connection of the filter capacitors) the neutral point is not present or the neutral point is present but is not related to the potentials on the input sides. The amplitude regulators are typically regulators with an integral portion, in particular, integral-action regulators.

Preferably, the voltage determining device determines a direct current component related to the neutral point for each of the phase voltages. In this case, the control device has an offset regulator for each of the phases, which receives the respective direct current component and, on the basis of the respective direct current component, determines a respective second correction value for each setpoint filter current and corrects the respective setpoint filter current by the respective determined second correction value. By this means, it can be achieved that the phase voltages are adjusted to be offset-free.

The offset regulators are typically regulators with an integral portion, in particular, integral-action regulators.

In order to determine the direct current components for the phase voltages, the voltage determining device receives a plurality of detected phase voltages during a respective detection period and determines the respective direct current component as the respective mean value thereof. Preferably, the control device determines the respective detection period for each phase individually and independently of the detection periods for the other phases. In particular, the control device can synchronize the respective detection period with the respective zero-crossing of the respective phase voltage. By means of this procedure, the direct current components can be determined particularly accurately.

The dynamic responses of the different regulators are preferably matched to one another such that the offset regulators have a dynamic response that is greater than the dynamic response of the amplitude regulator. A typical factor in the dynamic response is usually between 3 and 5. The offset regulators, however, preferably have a dynamic response that is lower than the dynamic response of the setpoint generator. A typical factor in the dynamic response is usually between ⅓ and ⅔.

Even if the offset regulators are not present, the amplitude regulators preferably have a dynamic response that is lower than the dynamic response of the setpoint generator. The dynamic response of the offset regulators is often very small in comparison with the dynamic response of the setpoint generator. A typical factor is between 0.1 and 0.2.

It is possible, in principle, that the different components of the control device are realized in hardware, in particular in the form of ASICs. Preferably, however, the control device is configured as a programmable control device. For example, the control device can be controlled by a microprocessor. Alternatively or additionally, the control device can contain components wherein the circuit as such is defined by programming. Typical examples of such components are FPGAs (field-programmable gate arrays) and PLAs (programmable logic arrays).

In this case, the control device is programmed with a control program. In this case, the control program comprises machine code, by means of which the control device is configured as a control device according to the invention.

In the case of an embodiment of the control device as a programmable control device, the object is further achieved in accordance with the invention with a control program including machine code, by means of which the control device is configured as a control device according to the invention.

The object is further achieved in accordance with the invention by means of a converter unit, with the control device of the converter unit being configured as a control device according to the invention.

BRIEF DESCRIPTION OF THE DRAWING

The above-described properties, features and advantages of this invention and the manner in which they are achieved are made more clearly and distinctly intelligible with the following description of the exemplary embodiments which are described in greater detail making reference to the drawings. Shown in the drawings in schematic representation:

FIG. 11 is a timing diagram.

DETAILED DESCRIPTION OF PREFERRED EMBODIMENTS

Figure 1:
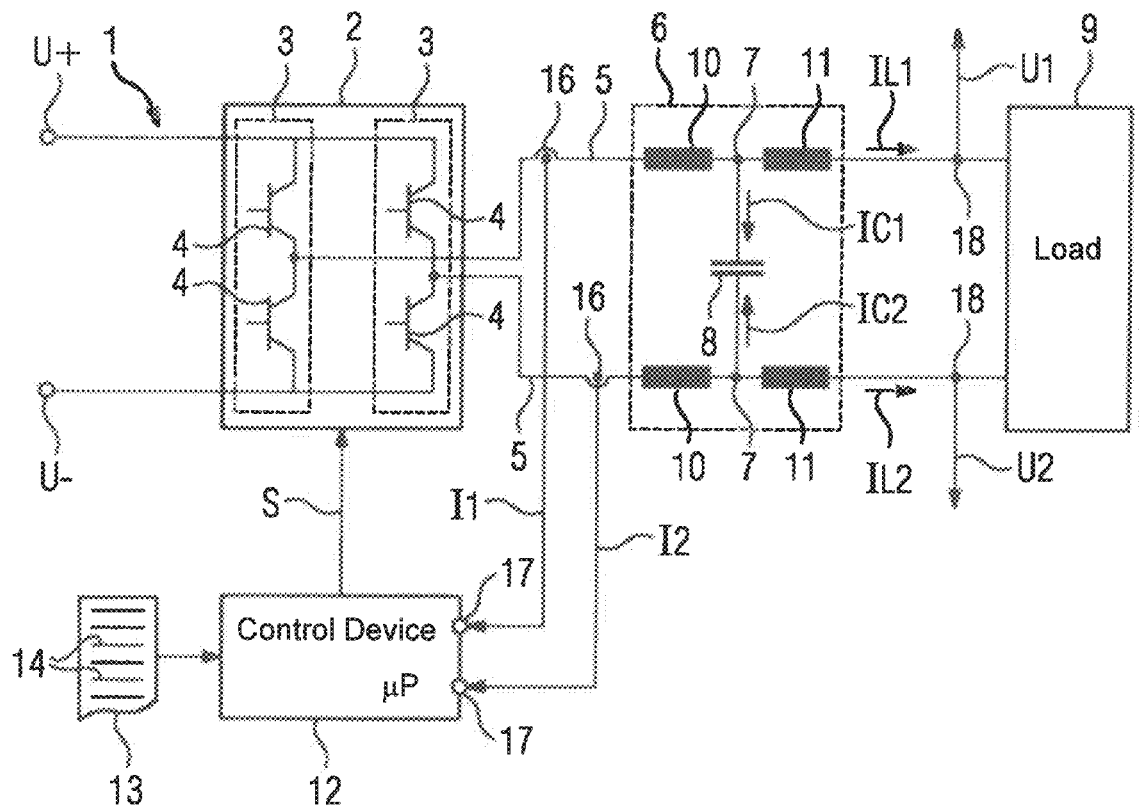
FIG. 1 is a converter unit.

According to FIG. 1, a converter unit 1 has a converter 2. A high potential U+ and a low potential U− are fed to the converter 2 at the input side. The potentials U+, U− are typically time-Invariant. However, they can also vary significantly. Nevertheless, it must be ensured that the high potential U+ is always higher than the low potential U−. The potentials U+, U− can be fed to the converter unit 1 from outside. Typically, however, they are generated within the converter unit 1, for example, by rectification of a single-phase or a polyphase alternating voltage from a larger electrical supply network. In this case, the converter unit 1 is configured as a converter unit with a direct current intermediate circuit.

The converter 2 has a number of phase units 3. The phase units 3 each have two switching elements 4 which are connected in series. Connected between the two switching elements 4 of each phase unit 3 is a respective phase line 5. By means of each phase unit 3, the converter 2 alternately switches one of the potentials U+, U− to the phase lines 5 and thereby feeds phase currents I1, I2 into the phase lines 5. For each phase, one (1) phase unit 3 and therefore also one (1) phase line 4 is provided. The switching elements 4 are shown in FIG. 1 as IGBTs. This embodiment is usual. A freewheeling diode is typically connected antiparallel to the switching elements 4. The freewheeling diodes are not shown in FIG. 1.

The number of phases is also two in the embodiment of FIG. 1, i.e. it is the minimum number of phases.

The converter unit 1 also has a filter device 6. The filter device 6 is arranged downstream of the converter 2. The phase currents I1, I2 are fed via the filter device 6. For each phase line 5, the filter device 6 has a connection point 7 at which a filter capacitor 8 is connected to the respective phase line 5. The filter device 6 serves, in particular, to reshape the pulse-shaped potentials U+, U− switched to the phase lines 5 into a sinusoidal form. The corresponding sinusoidal form is connected to an electrical load 9. The load 9 can be a single load. Typically, however, in the context of the present invention, it is a complex load, i.e. the load 9 consists of a plurality of individually switchable consumers. A transformer can also be arranged between the filter device 6 and the load 9. However, this is not necessarily required.

In the case of the embodiment according to FIG. 1, the two phase lines 5 are connected to one another via a single filter capacitor 8. Alternatively, two filter capacitors 8 connected in series could be provided. The filter device 6 further comprises, preferably upstream of the connection points 7, an inductor 10 arranged in each of the phase lines 5. These inductors are referred to below as upstream inductors 10. The filter device 6 further comprises, preferably downstream of the connection points 7, an inductor 11 arranged in each of the phase lines 5. These inductors are referred to below as downstream inductors 11. However, other embodiments are possible in which the upstream inductor 10 or the downstream inductor 11 are omitted. The filter device 6 can further comprise additional elements such as resistors, further capacitors or other inductors.

By means of the filter capacitor 8 or the filter capacitors 8, the filter device 6 taps off filter currents IC1, IC2 at the phase lines 5. The remaining portions of the phase currents I1, I2 are fed by the filter device 6 to the electrical load 9 as load currents IL1, IL2.

At any time point and for each phase, the relationship $$Ii=ICi+ILi \qquad (1)$$

applies, (where i=1 or 2 or, in general, i=1, 2, 3, etc., depending upon the number of phases).

The converter 2 also has a control device 12. The control device 12 controls the converter 2. The control device 12 can realize its functionality with a corresponding embodiment in hardware. For example, the control device 12 can have corresponding discrete components. Usually, however, the control device 12 is configured as a programmable control device. In this case, the control device 12 is programmed with a control program 13. The control program 13 comprises machine code by means of which the control device 12 is configured such that the control device 12 implements the functional units and functionalities described below. This applies both for the basic functionality of the control device 12 and also for the advantageous embodiments of the control device 12.

As is suggested in FIG. 1 with the indication "µP" within the control device 12, it is possible that the control device 12 is controlled by a microprocessor. In this case, the microprocessor executes the machine code 14 sequentially. Alternatively or additionally, the control device 12 can contain programmable components wherein, by means of the machine code 14, the connection of these components as such is statically specified. Typical examples of such components are FPGAs and PLAs.

Figure 2:
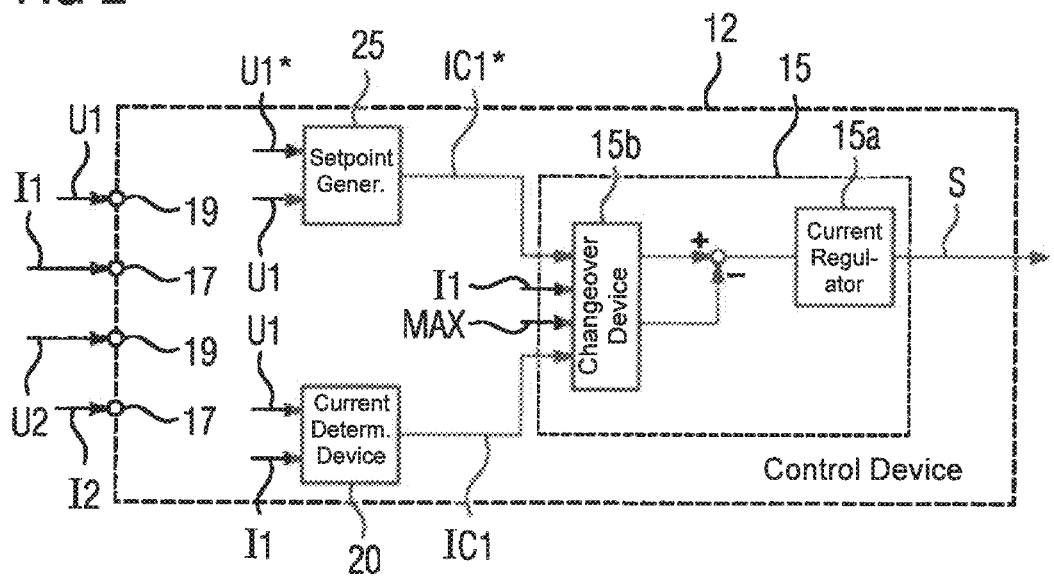
FIG. 2 is a control device.

The control device 12 also has a regulating device 15 as per FIG. 2. The regulating device 15 determines the activation signals S for the phase units 3 (more exactly: for the switching elements 4 of the phase units 3) and activates the phase units 3 (more exactly: the switching elements 4 of the phase units 3) accordingly. The manner in which the control device 12 determines the activation signals S in the different operating states of the converter unit 1 is the actual subject matter of the present invention.

Just as in the prior art, in the context of the present invention also, by means of corresponding current sensors 16 (see FIG. 1) at the output side of the converter 2, the phase currents I1, I2—i.e. the currents fed by the phase units 3 into the phase lines 5 and thus the currents flowing through the switching elements 4—are detected. The detected phase currents I1, I2 (more exactly: the corresponding measurement values) are fed to the control device 12 via corresponding inputs 17 (see FIG. 1). The control device 12 receives the measurement values.

A possible procedure for one phase current I1, I2 will now be described in relation to FIG. 2, specifically the phase current I1. Similar statements apply for phase current I2.

In the embodiment of FIG. 2, the regulating device 15 comprises a current regulator 15a. The current regulator 15a carries out a direct current regulation. A changeover device 15b is arranged upstream of the current regulator 15a. The filter current IC1, the associated setpoint filter current IC1*, the phase current I1 and a maximum value MAX are fed to the changeover device 15b.

In normal operation, the changeover device 15b feeds the filter current IC1 to the current regulator 15a as the actual value. Normal operation exists when and for as long as the amount of the phase current I1 has a minimum spacing from the maximum value MAX. In this case, the setpoint value is the associated setpoint filter current IC1*. It is provided by an associated setpoint generator 25. The output signal of the current regulator 15a corresponds to the activation signal S for the corresponding phase unit 3. The setpoint value IC1* is determined such that the profile of the phase voltage U1 downstream of the filter device 6 has a pre-determined amplitude U0, for example, approximately 325 V for a typical effective mains voltage of 230 V. The setpoint value IC1* is also determined such that the profile of the phase voltage U1 downstream of the filter device 6 has a sinusoldal profile.

The changeover device 15b continuously tests during normal operation whether the phase current I1 (more exactly: its value) flowing in the phase line 5 is less than the maximum value MAX (more exactly: has a minimum spacing from the maximum value MAX). If this is the case, normal operation obtains. However, if and as soon as the phase current I1 (more exactly: its value) reaches the maximum value MAX (or falls below the minimum spacing), the changeover device 15b switches over to short-circuit operation. In short-circuit operation, as the actual value, the changeover device 15b feeds to the current regulator 15a, not the filter current IC1, but the phase current I1. As the setpoint value, the changeover device 15b feeds to the current regulator 15a in this case, not the setpoint filter current IC1*, but the maximum value MAX or the inverse of the maximum value MAX, dependent upon whether the relationship I1=MAX or the relationship I1=−MAX applies.

Normally, in short-circuit operation, downstream of the filter device 6, the phase voltage U1 has an amplitude that is smaller than the pre-determined amplitude U0, for example, only approximately 25 V. In short-circuit operation, the changeover device 15b therefore continuously tests whether the amplitude of the phase voltage U1 has reached the pre-determined amplitude again. If this is the case, the changeover device 15b switches over into normal operation again.

Normally, the procedure described above leads to a stable operation. However, in order to prevent that, in rare individual cases, the changeover device 15b switches permanently back and forth between normal operation and short-circuit operation, it can be provided in a per se known manner also to provide a certain hysteresis behavior.

It is possible that the control device 12 receives the filter current IC1 as a measured variable. In this case, the filter current IC1 is detected directly by means of a corresponding current sensor (not shown in FIGS. 1 and 2) and is fed to the control device 12 and is therefore available to the control device 12.

Preferably, however, the control device 12 determines the filter current IC1 on the basis of detected measured variables U1, I1 received by the control device 12.

In particular, by means of a corresponding voltage sensor 18 (see FIG. 1), a phase voltage U1 of the corresponding phase line 5 is measured. The measured or detected phase voltage U1 (more exactly: the corresponding measurement value) is fed to the control device 12 according to the representation in FIG. 2. The control device 12 receives the phase voltage U1 via a corresponding input 19.

It is possible that the phase voltage U1 is measured within the filter device 6, in particular at the connection point 7 of the corresponding phase line 5. In this case, a current determining device 20 determines the filter current IC1 directly via the capacitance C of the filter capacitor 8:

$$IC1 = C \cdot \frac{dU1}{dt} \qquad (2)$$

Alternatively, it is possible that the phase voltage U1 is measured downstream of the filter device 6, in particular, after the downstream inductor 11. In this case, the current determining device 20 determines the filter current IC1 on the basis of the detected phase voltage U1 and the phase current I1 in a model-based manner. This will now be described in greater detail by reference to FIG. 3.

Figure 3:
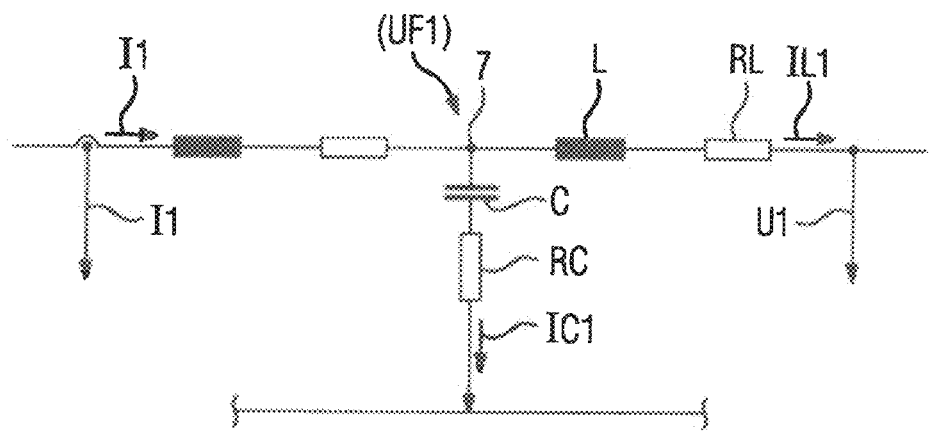
FIG. 3 is an equivalent circuit diagram.

The filter device 6 of FIG. 1 can be modeled in accordance with the equivalent circuit diagram of FIG. 3. According to FIG. 3, the downstream inductor 11 has a resistance value RL and an inductance value L. The filter capacitor 8 has a resistance value RC and a capacitance value C. The phase current I1 and the phase voltage U1 are measured at the positions given in FIG. 3.

For the filter voltage UF1 at the connection point 7 of FIG. 3, the following relationships apply:

$$UF1 = L\dot{I}L1 + RL \cdot IL1 + U1 \qquad (3)$$

and $$UF1 = RC \cdot (I1 - IL1) + \frac{1}{C} \cdot \int (I1 - IL1) dt \qquad (4)$$

By making equations (3) and (4) equal to one another and subsequent differentiation with respect to time, the following differential equation for the load current IL1 is obtained $$L \cdot \ddot{IL} + RL \cdot \dot{IL1} + \dot{U1} - RC \cdot (\dot{I1} - \dot{IL1}) - \frac{1}{C} \cdot (I1 - IL1) = 0 \qquad (5)$$

In equation (5), the resistance values RL and RC, the inductance value L and the capacitance value C are constants. The phase current I1 and the phase voltage U1 are measured and are therefore known. Therefore the only unknown remaining variable in equation (5) is the load current IL1. With a suitable initialization, the differential equation (5) can thus be solved. Using the phase current I1 and the now known load current IL1, the current determining device 20 can thus determine the filter current IC1 immediately and directly using the relation $$IL1 = I1 - IC1 \qquad (6)$$

A possible alternative procedure for a phase current I1, I2 will now be described in relation to FIG. 4, for a phase current I1, I2, in this case again for the phase current I1. Similar statements apply also for the phase current I2.

Figure 4:
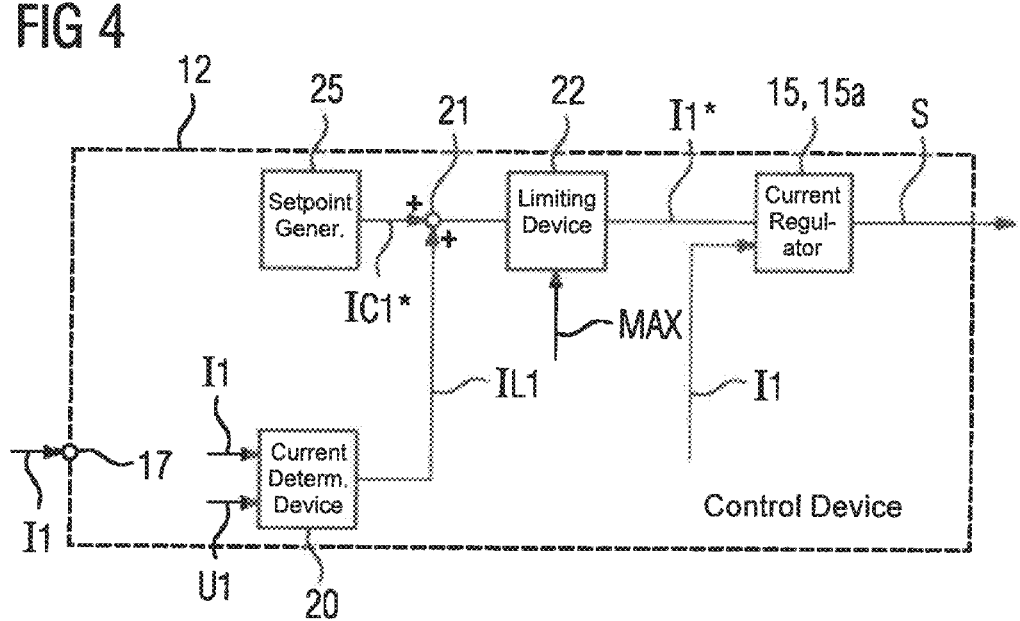
FIG. 4 is a further control device.

In the context of the embodiment according to FIG. 4, the phase current I1 is always fed to the current regulator 15a, that is, both in normal operation and also in short-circuit operation. A setpoint phase current I1* continues to be fed to the current regulator 15a.

The phase current I1 is detected directly by means of measuring technology and is therefore available. The setpoint phase current I1* is found as the sum of the setpoint filter current IC1* and the load current IL1.

It is possible that—in addition to the phase current I1—the control device 12 receives the load current IL1 or the filter current IC1 as a measured variable. In this case, the load current IL1 is available directly or after application of equation (1). Preferably, however, according to the procedure according to FIG. 4, the load current IL1 is determined on the basis of the phase current I1 and the phase voltage U1. For example, for this purpose, a corresponding current determining device 20 can be provided.

If the phase voltage U1 is tapped off within the filter device 6—in particular, directly at the corresponding connection point 7—by making corresponding use of the statements relating to FIG. 2 and applying equation (2), the associated filter current IC1 and therefrom, by applying equation (1), the load current IL1 can be determined. If, according to the representations in FIGS. 1 and 3, the phase voltage U1 is tapped off downstream of the filter device 6, by making corresponding use of the statements relating to FIG. 2 and applying equation (5), the associated load current IL1 can be determined.

The control device 12 also has an adding device 21. The adding device 21 receives from the current determining device 20 the load current IL1 determined thereby and the setpoint filter current IC1*. The adding device 21 adds the load current IL1 and the setpoint phase current IC1* and thus determines the setpoint phase current to be provided. However, this value is merely preliminary.

The adding device 21 feeds the preliminary setpoint phase current I1* to a limiting device 22. The limiting device 22 limits the setpoint phase current I1* (more exactly its amount) to the maximum value MAX. If the preliminary setpoint phase current I1* output by the adding device 21 lies between −MAX and +MAX, the limiting device 22 therefore does not adjust the setpoint phase current I1*. If, however, the setpoint phase current I1* is smaller than −MAX, the limiting device 20 limits the setpoint phase current I1* to the value −MAX. If, conversely, the setpoint phase current I1* is larger than +MAX, the limiting device 20 limits the setpoint phase current I1* to the value +MAX. The limiting device 22 feeds the correspondingly limited and therefore now final setpoint phase current I1* to the regulating device 15.

The detected phase current I1 continues to be fed to the regulating device 15. The regulating device 15 determines the activation signals S for the phase units 3 on the basis of the setpoint phase current I1* limited to the maximum value MAX and of the phase current I1. It thus performs a direct current regulation here also. The regulating device 15 therefore decides directly without any intermediate determination of a setpoint current, on the basis of the deviation of the phase current I1 from the setpoint phase current I1*, which of the potentials U+, U− is to be connected to the phase lines 5.

In the context also of the procedure of FIG. 4, therefore as a result, the respective phase line 5 is always temporarily separated from the corresponding potential U+, U− as soon as the amount of the phase current I1 flowing in the respective phase line 5 reaches the maximum value MAX. In the context of the procedure of FIG. 4, this is achieved in that the method for determining the activation signals S is retained unchanged, although the setpoint value I1* for the corresponding phase current I1 is limited. Thus, on a renewed falling below the maximum value MAX, a connection of the corresponding potential U+, U− to the corresponding phase line 5 takes place again entirely automatically. The observance of the minimum spacing from the maximum value is hereby achieved by the direct current regulation itself since it has a hysteresis behavior.

In the context of the procedure of FIG. 2, therefore, by means of the changeover device 15b and in the context of the procedure of FIG. 4, it is achieved by the limiting device 22 that on reaching the maximum value MAX, the converter 2 does not have to be switched off, rather the phase current I1 is limited to permissible values. In particular, the changeover device 15b and the limiting device 22 therefore intervene in the activation of the phase units 3 such that the amounts of the phase currents I1, I2, I3 fed into the phase lines 5 lie at the maximum value MAX until the voltage profile U1 downstream of the filter device 6 brought about by the activation of the phase units 3 again has the predetermined amplitude U0.

The current regulation can be a two-step regulation. Two-step regulation in this context means that of the two phase lines 5, one is always connected to the high potential U+ and the other to the low potential U−.

Alternatively, a three-step regulation is possible. Three-step regulation in this context means that—in addition to the two switching states according to the two-step regulation just described—both phase lines 5 can also be connected to the same potential U+, U−.

Further developments of the control device 12 of FIGS. 2 and 4 will now be described.

Figure 5:
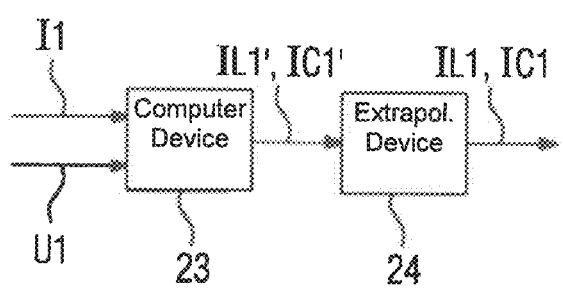
FIG. 5 is a current determining device.

The phase current I1 and the further measured variable—that is, either the filter current IC1 or the phase voltage U1—are detected at particular time points. The time points can coincide. However, this is not necessarily the case. If the time points occur separately, firstly the later detected measured variable must be calculated back to the time point of the earlier detected measured variable. On the other hand, a delay is caused by the determination of the load current IL1. For compensation of this delay, according to the representation in FIG. 5, the current determining device 20 therefore preferably has a computer device 23 and an extrapolation device 24. The computer device 23 determines a filter current IC1' or a load current IL1' for a time point at which the measured variables are detected, on the basis of which the filter current IC1' or the load current IL1' is determined. In an exceptional case, the measured variables are the associated phase current I1 and the associated filter current IC1 and, in a typical case, the associated phase current I1 and the associated phase voltage U1. The computer device 23 feeds the filter current IC1' or the load current IL1' determined by it to the extrapolation device 24. The extrapolation device 24 modifies the filter current IC1' or the load current IL1' fed to it. The modification is such that the filter current IC1' or the load current IL1' fed to the extrapolation device 24 is extrapolated in relation to a nominal frequency of the phase voltage U1 (typically 50 or 60 Hz) by an extrapolation time. The current IC1' or IL1' extrapolated accordingly is then fed to the changeover device 15b (in the case of the embodiment according to FIG. 2) or the adding device 21.

The extrapolation in relation to the nominal frequency takes place on the basis of the concept that the filter current IC1 and the load current IL1 typically oscillate more or less sinusoidally at the nominal frequency. Since, furthermore, the previous temporal profile of the filter current IC1' or of the load current IL1' is known from the past, a desired extrapolation time can be placed in relation to the period of the phase voltage U1 and the filter current IC1 or the load current IL1' can be extrapolated by the extrapolation time. The value extrapolated accordingly then corresponds to the filter current IC1 or the load current IL1, which the extrapolation device 24 feeds to the changeover device 15b or the adding device 21.

In principle, it is also possible to follow the temporally opposite sequence, that is, to modify the measurement values U1, I1 accordingly first and then, on the basis of the modified measurement values, to determine the filter current IC1 or the load current IL1.

In some cases, it is possible to determine the setpoint filter current IC1* by means of the setpoint generator 25 in a model-based manner and to pass it to the changeover device 15b or the adding device 21. In other cases, the determination of the setpoint filter current IC1* must be stabilized. For example, in the case of the embodiment of FIG. 4, errors in the determination of the load current IL1, for example, on the basis of component tolerances, measurement errors or the computation accuracy in the determination of the load current IL1 have the result that an initial error becomes ever greater in the course of time. Similar problems arise in the case of the embodiment of FIG. 2.

Figure 6:
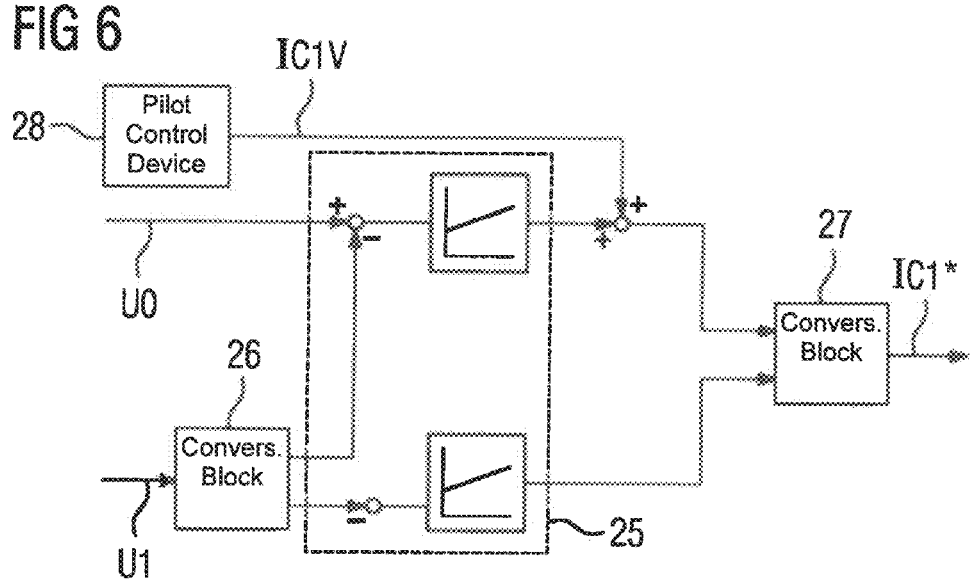
FIG. 6 is a setpoint generator.

In order to ensure a stable operation of the converter 2, in this case also, according to the representation in FIG. 6, the setpoint generator 25 can be configured as a voltage regulator. The measured phase voltage U1 is fed to the setpoint generator 25 as the actual value. The associated setpoint phase voltage U1* is fed to the setpoint generator 25 as the setpoint value. On the basis of the measured phase voltage U1 and the setpoint phase voltage U1*, the setpoint generator 25 then determines the setpoint filter current IC1*.

The phase voltage U1 is detected. The setpoint phase voltage U1* can be provided without difficulty as a function over time. In particular, the nominal value (=setpoint amplitude U0) and the frequency of the setpoint phase voltage U1* are known so that at every time point, the instantaneous setpoint value U1* of the phase voltage U1 can be determined. Preferably, however, according to the representation in FIG. 6, in a conversion block 26, a conversion of the detected phase voltage U1 into a co-rotating system takes place. Such systems are known in three-phase applications, for example, as dq systems. The conversion is also commonly known to persons skilled in the art. In this case, the setpoint generator 25 (as the setpoint generator for the setpoint filter current IC1*) comprises two separate regulators to which constant variables are fed as voltage setpoint variables, for example, the target amplitude U0 and the value 0. In this case, the output signals of the two separate regulators are further unified in a further conversion block 27 and converted into the non-co-rotating output system.

In the case of the embodiment according to FIG. 6, the setpoint generator 25 is a regulator which has an integral portion or an integrating behavior. For example, the setpoint generator 25 can be configured as a PI-regulator.

In the case on which FIG. 6 is based, wherein the converter 2 operates a two-phase voltage system, a single setpoint generator 25 can be sufficient for both phases, since the phase voltage U can be measured between the two phases.

The dynamic response of the setpoint generator 25 is typically relatively low. Mostly, the setpoint generator 25 requires two to four periods of the setpoint phase voltage U1*—in particular, approximately three periods—in order to regulate out a disturbance that occurs. In order to improve the dynamic response in the response to setpoint changes, the control device 12 therefore preferably has a pilot control device 28 according to the representation in FIG. 6. The setpoint phase voltage U1* (or the setpoint amplitude U0) is fed to the pilot control device 28. On the basis of the setpoint phase voltage U1*, the pilot control device 28 determines a pilot control value IC1V for the setpoint filter current IC1*. The pilot control value IC1V is applied to the setpoint filter current IC1* determined by the setpoint generator 25. The resulting setpoint filter current which is fed to the adding device 21 therefore results in this case as the sum of the setpoint filter current IC1* determined by the voltage regulator 25, and the pilot value IC1V determined by the pilot control device 28.

In conjunction with FIGS. 1 to 6, a two-phase alternating current system has been described above. In this case—at least in a typical case—the two phases are connected to one another via the filter capacitor 8, the phase voltage U1 is measured relative to the other phase and the phase currents I1, I2, the filter currents IC1, IC2 and the load currents IL1, IL2 are each equal in size and opposingly directed. However, a two-phase alternating current system is the exception in practice. The typical case is that the converter 2 operates a polyphase system according to the representation in FIGS. 7 and 8, in which the number of phases is at least three. In this case, the filter capacitors 8 can be connected according to the representation in FIG. 7 in the manner of a star connection with a common neutral point 29. The neutral point 29 can relate to the potentials U+, U− applied at the input side of the converter 2. Alternatively, it can be floating and variable relative to the potentials U+, U−. Alternatively, the filter capacitors 8 can connect respectively two of the phases to one another in the manner of a delta connection according to the representation in FIG. 8. The other statements relating to FIGS. 1 to 6 are also valid for the embodiments according to FIGS. 7 and 8. It should merely be noted that the corresponding embodiments and measures must be realized and implemented for each of the phases in a coordinated way. Insofar as conversions from a delta connection into a star connection and vice versa must be undertaken, these conversions are commonly known to persons skilled in the art. They are therefore not described further below.

Figure 7:
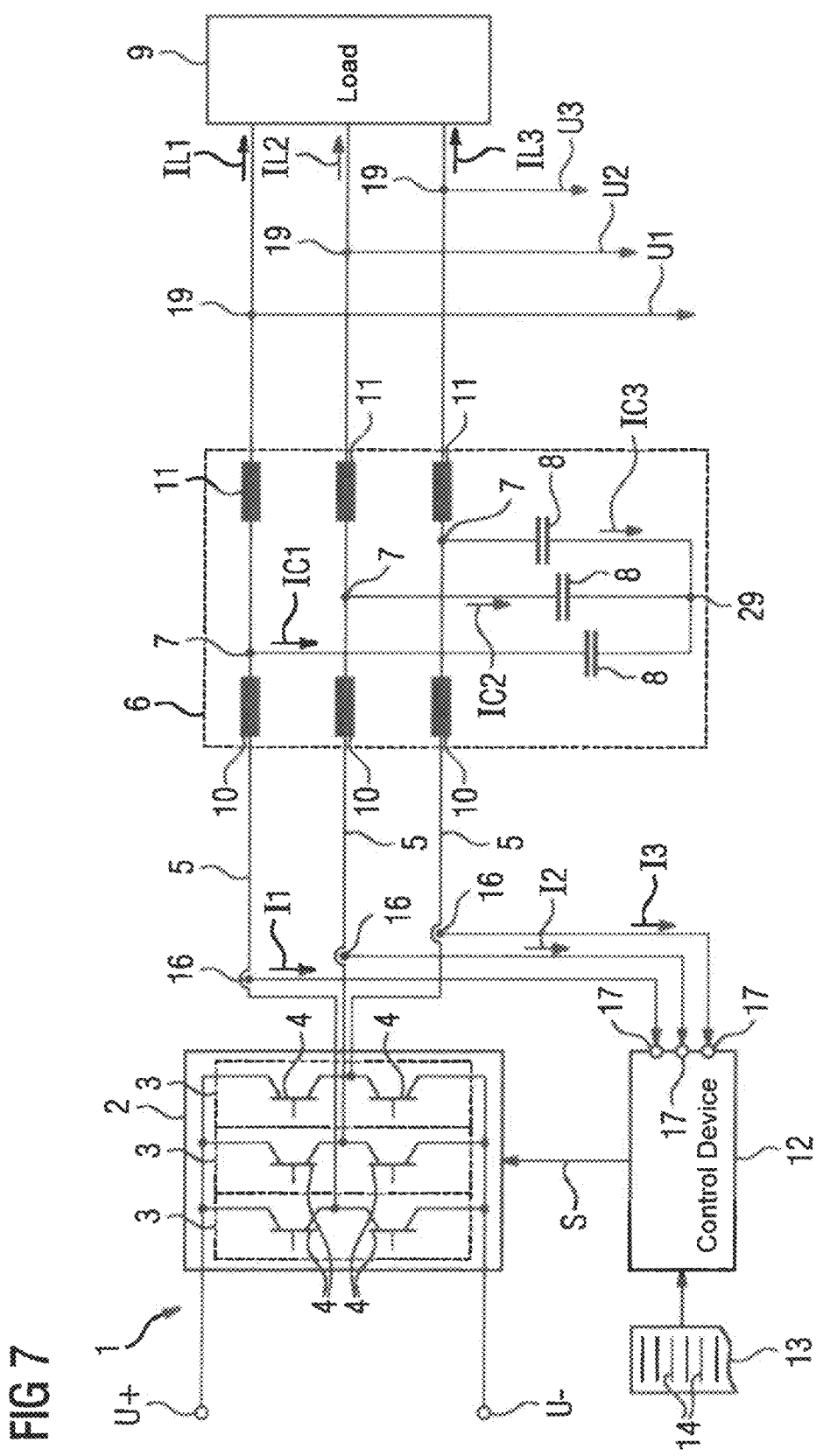
FIG. 7 is a further converter unit.
Figure 8:
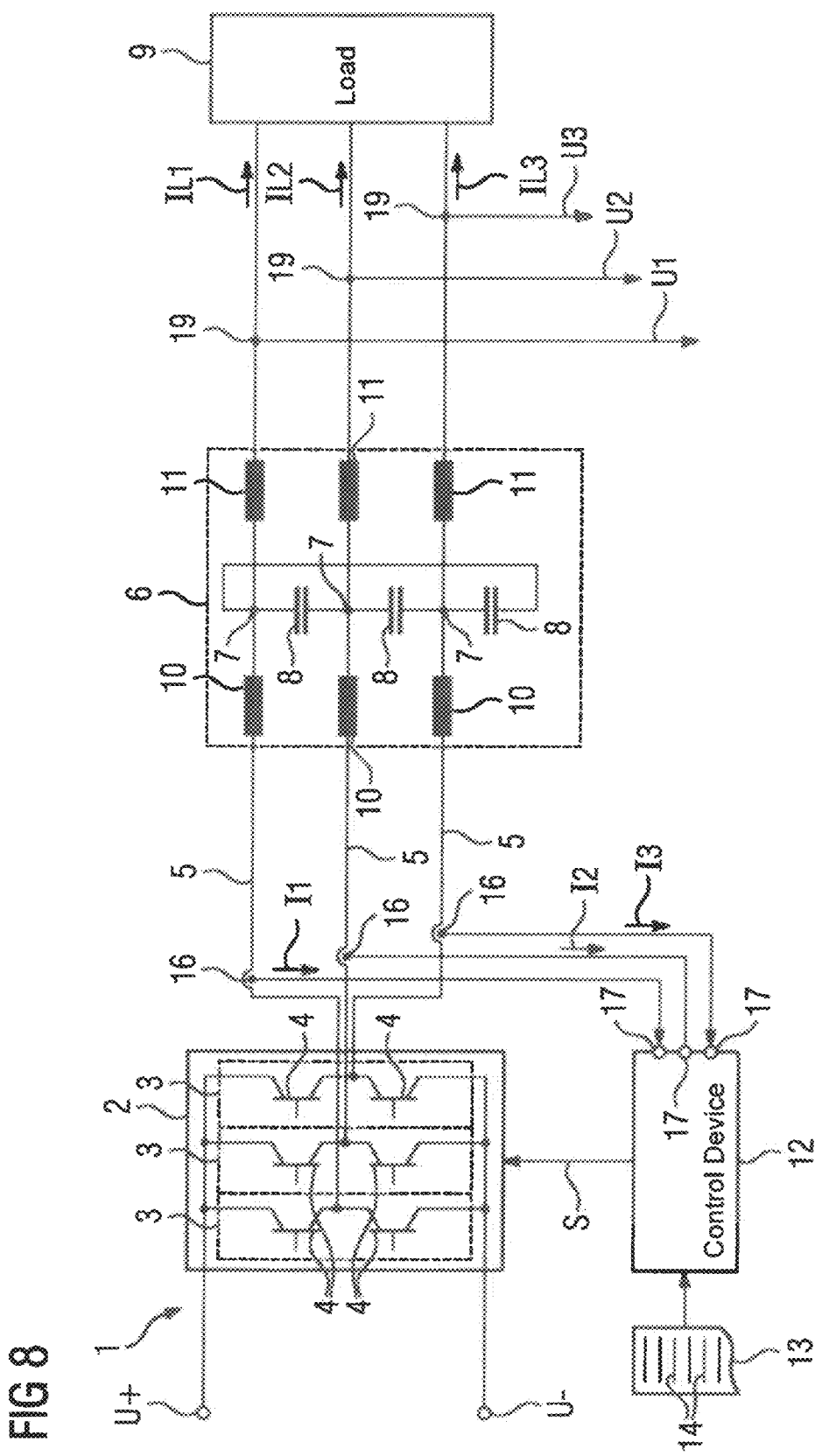
FIG. 8 is a further converter unit.
Figure 9:
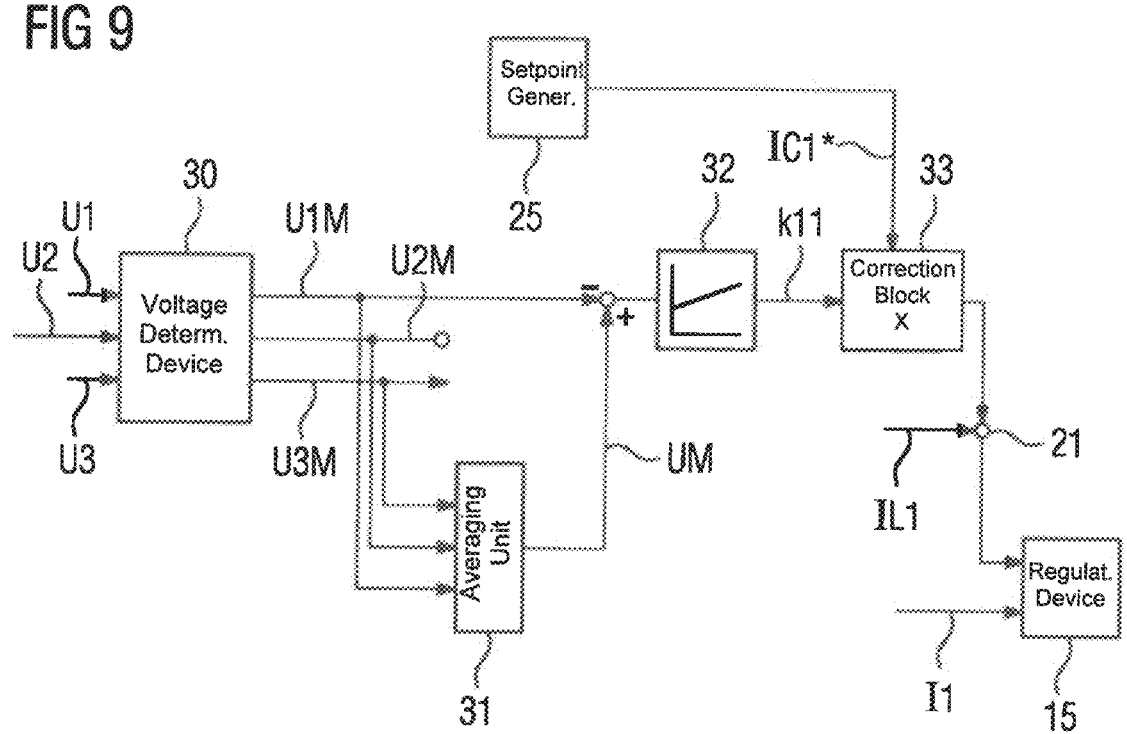
FIG. 9 is a portion of the control device of FIG. 2.
Figure 10:
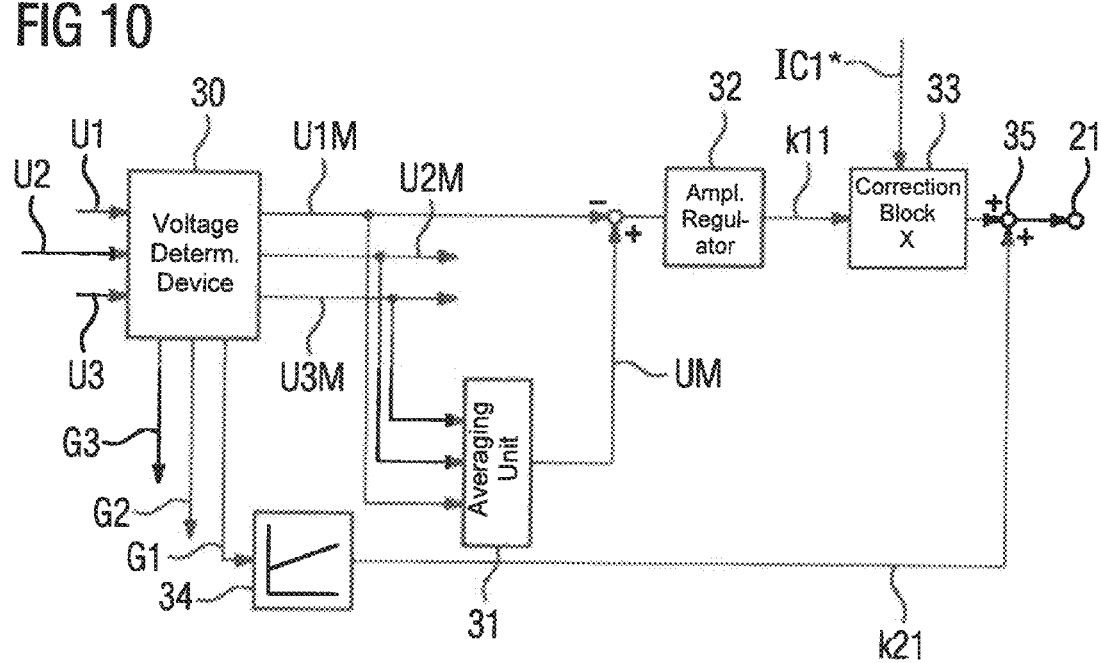
FIG. 10 is a supplementation of FIG. 9.

In the embodiments according to FIGS. 7 and 8, freewheeling diodes are present, although they are not shown in FIGS. 7 and 8. If the number of phases is at least three (usually exactly three), further developments of the control device 12 are however also possible and useful. The embodiments are shown in FIGS. 9, 10 and 11, in each case for a single phase. However, they are to be taken for all the phases and are therefore also explained for all phases.

According to FIG. 9, the control device 12 can have a voltage determining device 30 in this case. The voltage determining device 30 receives the detected phase voltages U1, U2, U3 for the phases. It determines—separately for each phase—an amplitude U1M, U2M, U3M in relation to the neutral point 29 in each case. In particular, the voltage determining device 30 can detect the phase voltages U1, U2, U3 sufficiently often over a whole number of periods and evaluate the detected voltage values. The relation to the neutral point 29 is known to persons skilled in the art. In order to determine the respective amplitude U1M, U2M, U3M, the voltage determining device 30 can approximate—separately for each phase—for example, the detected voltage values with a sine of the nominal frequency or, on the basis of the detected voltage values, determine an RMS (root mean square) value.

The voltage determining device 30 feeds the amplitudes determined U1M, U2M, U3M to an averaging unit 31.

The averaging unit 31 forms the mean value UM of the determined amplitudes U1M, U2M, U3M.

The control device 12 also has an amplitude regulator 32 for each of the phases. As the actual value, the respective amplitude U1M, U2M, U3M and, as the setpoint value, the mean value UM of the amplitudes U1M, U2M, U3M is fed to the amplitude regulator 32. The mean value UM therefore represents the common setpoint value for the amplitude regulator 32. In accordance with the representation of FIG. 9, the amplitude regulator 32 determines, on the basis of its respective actual value—for example, the amplitude U1M—and the setpoint value UM, a respective first correction value k11, k12, k13 for the respective setpoint filter current IC1*, IC2*, IC3*. The respective first correction value k11, k12, k13 and the respective setpoint filter current IC1*, IC2*, IC3* are fed to a respective first correction block 33 which corrects the respective setpoint filter current IC1*, IC2*, IC3* by the respective first correction value k11, k12, k3. The correction can be realized, in particular, by multiplication of the respective setpoint filter current IC1*, IC2*, IC3* by the respective first correction value k11, k12, k13.

The amplitude regulators 32—similarly to the voltage regulators 25—are regulators which have an integral portion or show an integrating behavior. For example, the amplitude regulators 32 can be configured as (pure) integral-action regulators.

Preferably, the voltage determining device 30 determines not only the amplitudes U1M, U2M*, U3M of the phase voltages U1, U2, U3, but also carries out further determinations. In particular, in accordance with the representation in FIG. 10, the voltage determining device 30 can additionally determine a respective direct current component G1, G2, G3 for each of the phase voltages U1, U2, U3. The direct current components G1, G2, G3 relate to the neutral point 29. In particular, the voltage determining device 30 can detect the phase voltages U1, U2, U3 sufficiently often over a number of periods and evaluate the detected voltage values. The relation to the neutral point 29 is known to persons skilled in the art. For the determination of the respective direct current component G1, G2, G3, the voltage determining device 30 can repeatedly detect the respective phase voltage U1, U2, U3 during a respective detection period T1, T2, T3, and—separately for each phase—form the respective mean value of the detected phase voltages U1, U2, U3.

The detection periods T1, T2, T3 each form a whole number of periods for the respective phase voltage U1, U2, U3. In principle, the detection periods T1, T2, T3 can be selected as desired for the phase voltages U1, U2, U3. In particular, they can be determined as uniform. Preferably, the control device 12 determines the detection periods T1, T2, T3 according to the representation in FIG. 11, but individually and independently of one another. In particular, the control device 12 can determine the respective detection periods T1, T2, T3 such that the respective first detection of a respective phase voltage U1, U2, U3 takes place immediately following the zero-crossing of the respective phase voltage U1, U2, U3. The zero-crossing typically relates to the real or virtual potential of the neutral point 29.

In the case of the determination of the direct current components G1, G2, G3, the control device 12 according to FIG. 10 further has an offset regulator 34 for each of the phases. The respective offset regulator 34 receives the respective direct current components G1, G2, G3. On the basis of the respective direct current component G1, G2, G3, it determines a respective second correction value k21, k22, k23 for the respective setpoint filter current IC1*, IC2*, IC3*. The respective second correction value k21, k22, k23 and the respective setpoint filter current IC1*, IC2*, IC3*—already corrected by the first correction value k11, k12, k13—are fed to a respective second correction block 35 which corrects the respective setpoint filter current IC1*, IC2*, IC3* by the respective second correction value k21, k22, k23. The correction can be realized, in particular, by adding the respective setpoint filter current IC1*, IC2*, IC3* and the respective second correction value k21, k22, k23.

The offset regulators 34—similarly to the voltage regulators 25 and the amplitude regulators 32—are regulators which have an integral portion or show an integrating behavior. For example, the offset regulators 34 can be configured as (pure) integral-action regulators.

The dynamic response of the offset regulators 34, the amplitude regulators 32 and the setpoint generators 25 should be matched to one another. In particular, the setpoint generators 25 are to have the greatest dynamic response. The dynamic response of the offset regulators 34 and of the amplitude regulators 32 should therefore be lower than those of the setpoint generators 25. Preferably, however, the offset regulators 34 have a dynamic response that is greater than the dynamic response of the amplitude regulators 32. In particular, the offset regulators 34 should react three to five times faster to a disturbance than the amplitude regulators 32. As compared with the setpoint generators 25, however, their dynamic response should be approximately ⅓ to ⅔.

Summarizing, the present invention therefore relates to the following subject matter:

A converter 2 alternately switches a high and a low potential U+, U− in each case via phase units 3 to phase lines 5 for a number of phases and thereby feeds phase currents I1, I2, I3 into the phase lines 5. The phase currents I1, I2, I3 are fed via a filter device 6 arranged downstream of the converter 2, said filter device tapping off filter currents IC1, IC2, IC3 via filter capacitors 8 connected to the phase lines 5 and feeding the remaining portions of the phase currents I1, I2, I3 to an electrical load 9 as load currents IL1, I12, IL3. The control device 12 receives the phase currents I1, I2, I3 fed in. A regulating device 15 of the control device 12 determines the activation signals S for the phase units 3 of the converter 2 by means of a direct current regulation to which currents, e.g. I1, IC1 flowing at the output side of the converter 2, are fed as actual values and, as setpoint values, the associated setpoint currents, e.g. I1*, IC1* are fed. The regulating device determines the activation signals S in such a way that a voltage profile downstream of the filter device 6 has a predetermined amplitude U0 if and for as long as the phase currents fed in have a minimum spacing from a predetermined maximum value MAX. Otherwise, the control device 12 engages, by means of a further device 15*b*, 22, in the activation of the phase units 3 so that the phase currents I1, I2, I3 are limited to the maximum value MAX until the voltage profile downstream of the filter device 6 again has the predetermined amplitude U0.

The present invention has many advantages. Due to the direct current regulation which is effective both in normal operation and in short-circuit operation, in the event of a short-circuit, no changeover from a voltage regulation to a current regulation is required. By this means, transient disturbances which would otherwise occur are prevented. Nevertheless, short-circuit currents, in particular, can be dynamically prepared and limited. It is a simple transition from a microgrid operation to an operation in parallel with the grid and vice versa. A stable operation at the current limit of the converter 2 is also possible. Furthermore, the control device 12 according to the invention can also be used in conjunction with a load 9 which has an increased current requirement dynamically—for example, when switching on—for a certain time, but thereafter needs less current again. An example of such a load 9 is a larger asynchronous machine. In normal operation, a high quality can be achieved in the provision of the phase voltages U1, U2, U3. This applies regardless of whether the load 9 is linear or non-linear and/or whether the load 9 is symmetric or asymmetric. Furthermore, the procedure according to the invention is not restricted to a particular coordinate system. If required, it can be carried out directly with the phase currents I1, I2, I3 or filter currents IC1, IC2, IC3 or load currents IL1, IL2, IL3 or with two mutually orthogonal currents and a zero current or a total current in a fixed coordinate system (usually designated an ab0 system) or with two mutually orthogonal currents and a zero current or summation current in a co-rotating coordinate system (usually designated a dq0 system).

Although the invention has been illustrated and described in detail with the preferred exemplary embodiment, the invention is not restricted by the examples disclosed and other variations can be derived therefrom by a person skilled in the art without departing from the protective scope of the invention.

The invention claimed is:

1. A control device for a converter, the converter configured to switch a high potential and a low potential provided at an input side of the converter alternately for each of a number of phases via a phase unit to phase lines and to thereby feed phase currents to the phase lines and to the control device, the converter comprising a filter device arranged downstream of the converter and tapping off a portion of filter currents at the phase lines via a plurality of filter capacitors serially connected between the phase lines at connection points of the phase lines or via a plurality of filter capacitors connected each to one of the phase lines at the connection points, and feeding remaining portions of the phase currents to an electrical load as load currents, the control device comprising:

a regulating device determining control signals for the phase units by means of a direct current regulation which receives actual current values flowing at an output side of the converter and associated setpoint currents as setpoint values in such a way that a voltage profile downstream of the filter device caused by control of the phase units has a predetermined amplitude when and for as long as the amounts of the phase currents fed into the phase lines have a minimum spacing from a predetermined maximum value, and the regulating device controlling the phase units with the control signals, a further device causing the control device to control the phase units such that magnitudes of the phase currents fed into the phase lines are limited to a maximum value until the voltage profile downstream of the filter device caused by the control of the phase units has again the predetermined amplitude, wherein the further device is configured as a changeover device which in a normal operation, feeds the filter currents to the regulating device as actual values and feeds setpoint filter currents determined by a setpoint generator as setpoint values when and for as long as the magnitudes of the phase currents fed into the phase lines have the minimum spacing from the predetermined maximum value, changes from the normal operation into a short-circuit operation by feeding to the regulating device the phase currents as actual values and by feeding as the setpoint value the maximum value or the inverse of the maximum value when and as soon as the magnitudes of the phase currents fall below the minimum spacing from the maximum value, and changes from the short-circuit operation back to the normal operation when and as soon as the voltage profile downstream of the filter device caused by the control of the phase units has again the predetermined amplitude.

2. The control device of claim 1, wherein the control device receives the filter currents as measured set.

3. The control device of claim 1, wherein the control device determines the filter currents based on measured values detected at the output side of the converter and received by the control device.

4. The control device of claim 3, further comprising:
a computer device which determines the filter currents for a time point at which the measured values are detected, and
an extrapolation device receiving the filter currents from the computer device and modifying the received filter currents such that the filter currents are extrapolated in relation to a nominal frequency of the phase voltages by an extrapolation time, and feeding the modified filter currents to the changeover device.

5. The control device of claim 3, further comprising:
an extrapolation device modifying the measured values based on which the filter currents are determined such that the filter currents are extrapolated in relation to a time point at which the measured values are measured relative to a nominal frequency of the phase voltages by an extrapolation time, and
a computer device receiving the modified measured values from the extrapolation device and determining the filter currents based on the received modified measured values and feeding the filter currents to the changeover device.

6. The control device of claim 3, wherein the control device receives the phase voltages of the phase lines measured within or downstream of the filter device, and wherein the setpoint generator is configured as a voltage regulator receiving the detected phase voltages and setpoint phase voltages and determining the setpoint filter currents based on the measured phase voltages and the setpoint phase voltages.

7. The control device of claim 6, wherein the control device has pilot control devices receiving the setpoint phase voltages and determining, based on the setpoint phase voltages, pilot control values for the setpoint filter currents determined by the setpoint generators, and applying the pilot control values to the setpoint filter currents determined by the setpoint generators.

8. The control device of claim 7, wherein the number of phases is at least three, the control device further comprising:
a voltage determining device receiving the phase voltages of the phase lines detected within or downstream of the filter device and determining for each of the phase voltages a respective amplitude in relation to a neutral point, and
an amplitude regulator for each of the phases, with the amplitude regulator receiving the respective amplitude in relation to a neutral point as an actual value and a mean value of these respective amplitudes as a setpoint value, and determining, based on the basis of the actual value and the setpoint value, a first correction value for each setpoint filter current and correcting the setpoint filter current with the first correction value.

9. The control device of claim 8, further comprising an offset regulator for each of the phases,
wherein the voltage determining device determines for each of the phase voltages a direct-current component related to the neutral point, and
wherein the offset regulator for each of the phases receives the respective direct-current component and determines from the respective direct-current component for each setpoint filter current a respective second correction value, and corrects the respective setpoint filter current with the respective determined second correction value.

10. The control device of claim 9, wherein the voltage determining device receives a plurality of detected phase voltages during a respective detection period and determines the respective direct-current component as the mean value thereof, and wherein the control device determines the respective detection period for the phases individually and independent of the detection periods for other phases.

11. The control device of claim 1, wherein the control device is configured as a programmable control device which is programmed with a control program embodied on a non-transitory computer-readable medium and comprising machine code which, when loaded and executed in the programmable control device, enables the control device to operate in accordance with claim 1.

12. A control program for a control device for a converter, the control device configured as a programmable control device which is programmed with a control program embodied on a non-transitory computer-readable medium and comprising machine code which, when loaded and executed in the programmable control device, enables the control device to operate in accordance with claim 1.

13. A converter unit, comprising:
a converter configured to switch a high potential and a low potential provided at an input side of the converter alternately for each of a number of phases via a phase unit to phase lines and to thereby feed phase currents into the phase lines,
a filter device arranged downstream of the converter and tapping off a portion of filter currents at the phase lines via a plurality of filter capacitors serially connected between the phase lines at connection points of the phase lines or via a plurality of filter capacitors connected each to one of the phase lines at the connection points, and feeds remaining portions of the phase currents to an electrical load as load currents, and
a control device controlling the converter, the control device comprising
a regulating device determining control signals for the phase units by means of a direct current regulation which receives actual current values flowing at an output side of the converter and associated setpoint currents as setpoint values in such a way that a voltage profile downstream of the filter device caused by control of the phase units has a predetermined amplitude when and for as long as the amounts of the phase currents fed into the phase lines have a minimum spacing from a predetermined maximum value, and controlling the phase units with the control signals, a further device causing the control device to engage in the control of the phase units such that magnitudes of the phase currents fed into the phase lines are limited to a maximum value until the voltage profile downstream of the filter device caused by the control of the phase units has again the predetermined amplitude, wherein the further device is configured as a changeover device which in a normal operation, feeds the filter currents to the regulating device as actual values and feeds the setpoint filter currents determined by a setpoint generator as setpoint values when and for as long as the magnitudes of the phase currents fed into the phase lines have the minimum spacing from the predetermined maximum value, changes from the normal operation into a short-circuit operation by feeding to the regulating device the phase currents as actual values and by feeding as the setpoint value the maximum value or the inverse of the maximum value when and as soon as the magnitudes of the phase currents fall below the minimum spacing from the maximum value, and changes from the short-circuit operation back to the normal operation when and as soon as the voltage profile downstream of the filter device caused by the control of the phase units has again the predetermined amplitude.

* * * * *